3,480,980
DOCK PLATE
Young Z. Yoon, Des Moines, and Wayne B. Noland, Avon Lake, Iowa, assignors to Woodford Manufacturing Company, Des Moines, Iowa, a corporation of Iowa
Filed Sept. 20, 1967, Ser. No. 669,018
Int. Cl. E01d 15/12; E05b 5/02
U.S. Cl. 14—72                                                6 Claims

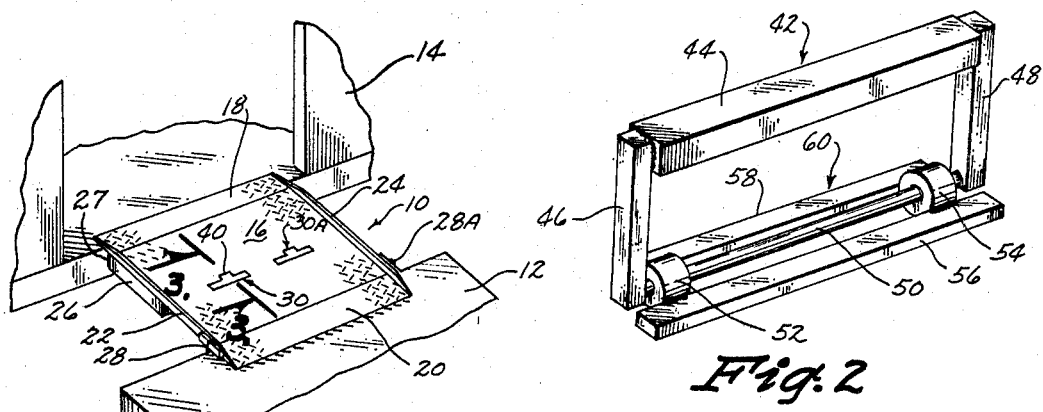
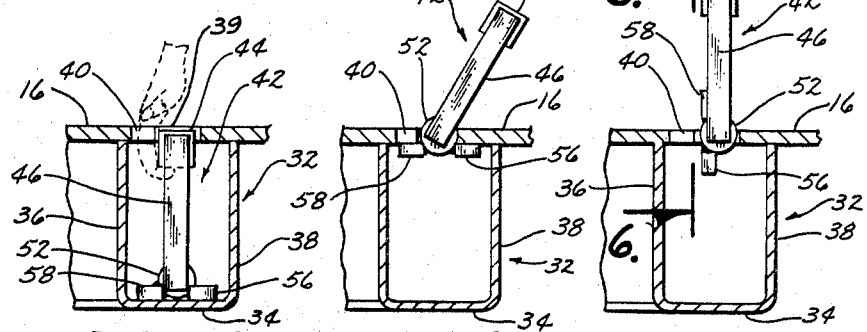
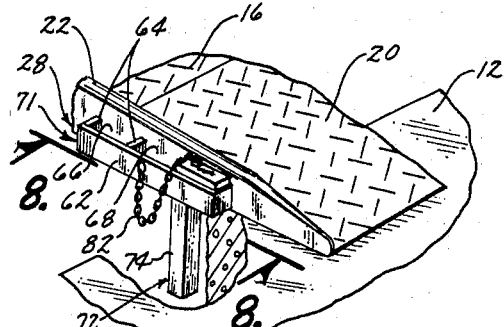
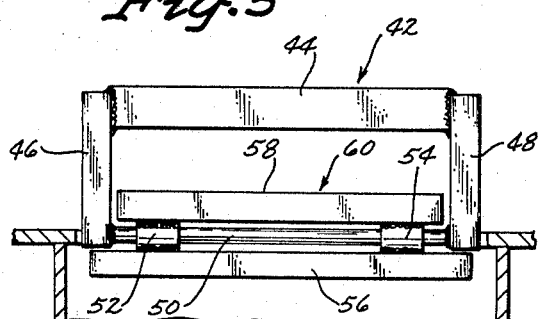
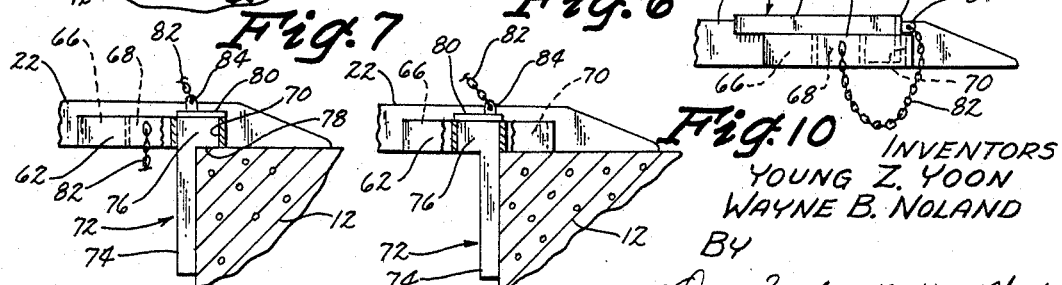
INVENTORS
YOUNG Z. YOON
WAYNE B. NOLAND United States Patent Office 3,480,980
Patented Dec. 2, 1969

ABSTRACT OF THE DISCLOSURE

A dock plate including a pair of lift loop assemblies mounted thereon. The lift loop assemblies are normally stored within the dock plate but may be selectively raised with respect thereto to permit the fork members of the lifting truck to pass therethrough to facilitate the movement of the dock plate from one location to another.

---

Dock plates are extensively used to bridge the space between two spaced apart supporting surfaces, such as a loading or unloading dock and the bed of a vehicle or the like. The dock plates are extremely heavy and their transportation from one location to another is difficult.

Therefore, one of the principal objects of this invention is to provide a dock plate including a pair of lift loop assemblies mounted thereon to facilitate the movement of the dock plate by a lifting truck or the like.

A further object of this invention is to provide a dock plate including a pair of lift loop assemblies mounted therein which may be easily removed therefrom for replacement.

A further object of this invention is to provide a dock plate including a pair of lift loop assemblies mounted thereon which may be selectively raised with respect to the dock plate and thence pivoted with respect thereto, the lift loop assemblies being so designed so as to remain in a substantially upright position to facilitate the passage of the fork members of a lifting truck therethrough.

A further object of this invention is to provide a dock plate which includes a pair of lift loop assemblies, the lift loop assemblies being easily fabricated.

A further object of this invention is to provide a dock plate including a pair of lift loop assemblies mounted thereon which is durable in use and refined in appearance.

A further object of this invention is to provide a dock plate having a locking pin means associated therewith, the locking pin means being reversible and conveniently stored on the dock plate.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the dock plate as it is placed between an unloading dock and a vehicle which are partially shown;

FIG. 2 is a perspective view of one of the lift loop assemblies;

FIG. 3 is an enlarged sectional view as seen on line 3—3 of FIG. 1 illustrating one of the lift loop assemblies in its stored condition, broken lines indicating the hand of a person extending through an opening in the dock plate to facilitate the upward movement of the assembly;

FIG. 4 is a view similar to FIG. 3 illustrating the lift loop assembly after it has been raised and pivoted with respect to the dock plate;

FIG. 5 is a view similar to FIGS. 3 and 4 and which illustrates the manner in which the lift loop assembly is removed from the dock plate;

FIG. 6 is a view as would be seen on line 6—6 of FIG. 5;

FIG. 7 is a perspective view of a locking pin means associated with the dock plate;

FIG. 8 is a sectional view as seen on line 8—8 of FIG. 7;

FIG. 9 is a view similar to FIG. 8 but which illustrates a locking pin in an alternate position; and FIG. 10 is a side view of the locking pin in its stored position.

The dock plate is generally designated by the reference numeral 10 and is shown in perspective in FIG. 1 in a position wherein it is extending between an unloading dock 12 and a box car 14 or the like. Dock plate 10 includes a central portion 16 and inclined approach portions 18 and 20 at opposite ends thereof. Dock plate 10 also includes raised rib portions 22 and 24 which extend upwardly from opposite sides of the plate as seen in FIG. 1. Dock plate 10 also includes an under structure 26 which extends downwardly therefrom as seen in FIG. 1 and also includes a pair of locking means 28 and 28A positioned at opposite sides thereof adjacent approach portion 20 (FIG. 1). Under structure 26 defines a fixed stop 27 at one end thereof as seen in FIG. 1.

Dock plate 10 is provided with a pair of spaced apart openings 30 and 30A formed in central portion 16 as best illustrated in FIG. 1. A U-shaped well 32 is positioned immediately below opening 30 and forms a portion of the under structure 26. For purposes of description, well 32 will be described as including a bottom portion 34 and opposite sides 36 and 38. Opening 30 is substantially T-shaped and includes an elongated opening portion 39 and a finger receiving portion 40 extending therefrom as best illustrated in FIG. 1. Opening 30A and the well associated therewith will not be described in detail inasmuch as they are identical to opening 30 and well 32.

Dock plate 10 is provided with a pair of lift loop assemblies 42 which are mounted in the wells below openings 30 and 30A. Each of the lift loop assemblies are identical and for that reason only one will be described. Lift loop assembly 42 comprises a nose bar or handle means 44 having a pair of side bars 46 and 48 secured to the opposite ends thereof by welding or the like which extend transversely therefrom as best illustrated in FIGS. 2 and 6. Assembly 42 also comprises a shaft 50 which is welded to the other end of side bars 46 and 48 and which extends therebetween parallel to nose bar 44. Assembly 42 also comprises a pair of pivot tubes 52 and 54 which have a front retaining bar 56 welded to one side thereof and a rear retaining bar 58 welded thereto opposite to bar 56. As seen in FIG. 6, front retaining bar 56 has a length greater than nose bar 44 while rear retaining bar 58 has a length less than the length of nose bar 44 to permit the limited pivotal movement of the retaining bars so that rear retaining bar 58 may be received between side bars 46 and 48. For purposes of description, front retaining bar 56, rear retaining bar 58 and pivot tubes 52 and 54 will be described as a retaining bar assembly 60. Preferably, lift loop assembly 42 is constructed of a steel material.

FIG. 3 illustrates the lift loop assembly 42 in its stored condition within well 32. When it is desired to transport the dock plate 10, it is simply necessary to reach down into well 32 through the finger receiving opening portion 40 as illustrated in FIG. 3 and pull the lift loop assembly 42 upwardly until the retaining bars 56 and 58 engage the under side of central portion 16 as illustrated in FIG. 4. The nose bar 44 is then pivoted from a vertical position to the tilted position seen in FIG. 4 and the weight of nose bar 44 is greater than the remainder of the mass so that the unit will remain in the tilted position seen in FIG. 4. The tilted position of FIG. 4 is maintained due to the fact that side bars 46 and 48 engage central portion 16 as illustrated in FIG. 4 and the weight of nose bar 44 is sufficient to maintain the frictional engagement between the side bars and the central portion 16 to prevent the assembly from falling down into the well. Likewise, the lift loop assembly in the other well would also be raised from its position within its respective well to the tilt position. The dock plate may then be transported by simply causing the fork members of a lift truck or the like to pass beneath the nose bar 44 and between the side bars of each of the lift loop assemblies. The fork members can then be raised and the engagement of the retaining bars with the under side of central portion 16 will cause the dock plate to be lifted. When the dock plate has been transported to its desired position, the lift truck will be maneuvered to withdraw the fork members from their engagement with the lift loop assemblies. As soon as the fork members are so removed, the lift loop assemblies will either fall down into the wells or they can be manually inserted. Each of the lift loop assemblies can be removed from the well by simply causing the retaining bars to be pivoted with respect to the side bars so that the rear retaining bar 58 is positioned between the side bars 46 and 48 as illustrated in FIGS. 5 and 6. As seen in FIGS. 5 and 6, the retaining bars will then be vertically disposed with respect to each other and the lift loop assembly may be removed from the well portion by causing the retaining bars to be withdrawn through opening portion 39. Thus, the lift loop assemblies can be easily removed if desired for replacement or repair. The lift loop assemblies are extremely easy to assemble and are very durable in use.

The dock plate is locked into its desired position between the vehicle 14 and the unloading dock 12 through the use of the locking means 28 and 28A. Inasmuch as locking means 28 and 28A are identical, only locking means 28 will be described. Locking means 28 includes a bar member 62 which is spaced laterally of rib portion 22 by means of a plurality of spacers 64 which define compartments 66, 68 and 70. Bar 62 and spacers 64 define a bracket 71. The numeral 72 designates a locking pin having a shank portion 74 and a head portion 76 extending laterally therefrom thereby defining a shoulder 78 therebetween. A plate 80 is welded to the upper surface of head portion 76 and one end thereof extends beyond the outer end of head portion 76 as illustrated in FIGS. 8 and 9. A chain 82 is secured to bar 62 at one end thereof and is secured at its other end to an ear 84 which is secured to the upper end of plate 80 as illustrated in FIG. 7. As seen in FIGS. 8 and 9, the compartments 66, 68 and 70 have a width sufficient to receive the head portion of the locking pin and the downward movement of the locking pin is prevented by the plate 80 which engages the upper surface of the spacers 64. As seen in FIGS. 8 and 9, the locking pin can be positioned in any of the various compartments and may be oriented so that the head portion extends either towards or away from the unloading dock to permit the locking pin to be selectively positioned to insure that the shank portion thereof will engage the outer end of the unloading dock. FIG. 10 illustrates the locking pin 72 in a stored condition and it can be seen that the head portion 76 thereof is received within compartment 70 and that shank portion 74 engages and rests upon the upper ends of spacers 64. Thus, the locking pin can be conveniently stored in a manner whereby the pin will not be inadvertently damaged. It can be appreciated that the engagement of the shank portion 74 of the locking pin with the outer end of the unloading dock will prevent movement of the dock plate towards the unloading dock. The under structure 26 will engage the vehicle and this engagement will prevent the dock plate from moving towards the vehicle.

Preferably the entire dock plate together with the lift loop assemblies 42 and the locking pin means are constructed of a steel material.

Thus, it can be seen, that a convenient means has been provided for transporting a dock plate from one position to the other. The lift loop assemblies are conveniently stored and are readily accessible to permit the dock plate to be readily moved.

Thus, it can be seen, that the device accomplishes at least all of its stated objectives.

Some changes may be made in the construction and arrangement of our dock plate without departing from the real spirit and purpose of our invention, and it is our intention to cover by our claims, any modified forms of structure or use of mechanical equivalents which may be reasonably included within their scope.

We claim:

1. In a portable dock plate,
a plate member having opposite approach ends and a pair of openings formed therein therebetween,
a compartment in said plate member below each of said openings,
and a lift loop assembly mounted in each of said compartments and being movable from an inoperative position in said compartment to an operative position whereby a portion of the lift loop assembly extends upwardly from said plate member adapted to detachably receive a lifting member for transportation of the dock plate,
each of said lift loop assemblies comprising a nose bar having first and second side bars secured thereto at opposite ends and extending therefrom and a shaft secured to said side bars in a spaced relationship to said nose bar and parallel thereto, each of said lift loop assemblies also comprising a retaining bar means pivotally secured to said shaft, said retaining bar means being pivotally movable to a first position with respect to said shaft whereby said retaining bar means is adapted to engage said plate member to limit the upward movement of the lift loop assembly, said retaining bar means being pivotally movable to a second position with respect to said shaft whereby the entire lift loop asembly may be removed from the compartment.

2. The dock plate of claim 1 wherein at least one pivot tube rotatably embraces said shaft, said retaining bar means comprising a front retaining bar to be secured to said pivot tube at one side thereof and a rear retaining bar secured to said pivot tube opposite to said front retaining bar and being parallel thereto, said front and rear retaining bars being parallel to said shaft and said nose bar.

3. The dock plate of claim 2 wherein said rear retaining bar has a length less than the distance between said first and second side bars and wherein said front retaining bar has a length greater than the distance between said first and second side bars so that said rear retaining bar will be positioned between said first and second side bars and in the same plane therewith when said retaining bar means is pivotally moved to its said second position with respect to said shaft.

4. The dock plate of claim 2 wherein each of said openings are rectangular in shape, the longitudinal axis of said openings being transverse to the longitudinal axis of said dock plate.

5. The dock plate of claim 4 wherein each of said openings have an enlarged hand receiving portion to permit the insertion of a portion of a person's hand therethrough to facilitate the movement of the lift loop assembly to an operative position.

6. A dock plate having approach ends adapted to bridge supporting structures, a fixed stop extending below said dock plate and inwardly of one approach end, said dock plate having a pair of removable stop means secured to opposite sides of said dock plate inwardly of its other approach end; each of said stop means including a laterally extending bracket means having a plurality of compartments formed therein each adapted to removably receive a locking pin extending therethrough which is adapted to engage one of the supporting structures, each of said locking pins including a head portion having a top, bottom, opposite ends with opposite sides, and an elongated shank portion extending downwardly from the bottom of said head portion adjacent one end, said head portion having a shape and size which corresponds to the shape and size of each of said compartments so that said head portion may be received within one of said compartments, each of said compartments having opposite ends, said head portion having a limiting means secured thereto which is adapted to maintain said locking pin in an operative position within one of said compartments, said shank portion extending downwardly through said compartment adjacent one end thereof when said locking pin is in an operative position, said shank portion being offset with respect to said head portion whereby the reverse operative positioning of said head portion in one of said compartments will cause said shank portion to extend downwardly through said compartment adjacent the other end thereof to vary the positioning of said shank portion with respect to said one supporting structure, said shank portion being longer than the length of a plurality of said compartments whereby said shank portion will lie across the length of said compartments when in an inoperative position with the other end of said head portion extending downwardly into one of said compartments for storage.

References Cited

UNITED STATES PATENTS

| | | | |
|---|---|---|---|
| 2,337,138 | 12/1943 | Van Berg | 14—72 |
| 2,452,222 | 10/1948 | Bryson | 14—72 |
| 2,521,349 | 9/1950 | Diamond | 14—72 |
| 2,537,750 | 1/1951 | Gretschel | 16—114 XR |
| 2,670,484 | 3/1954 | Bintliff | 14—72 |

FOREIGN PATENTS 971,051  9/1964  Great Britain.

JACOB L. NACKENOFF, Primary Examiner